United States Patent
Sima et al.

(10) Patent No.: US 10,497,139 B2
(45) Date of Patent: Dec. 3, 2019

(54) METHOD AND SYSTEM FOR PHOTOGRAMMETRIC PROCESSING OF IMAGES

(71) Applicant: VITO NV, Mol (BE)

(72) Inventors: Aleksandra Sima, Mol (BE); Stefan Livens, Mol (BE); Bavo Delaure, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 15/322,027

(22) PCT Filed: Jul. 7, 2015

(86) PCT No.: PCT/EP2015/065524
§ 371 (c)(1),
(2) Date: Dec. 23, 2016

(87) PCT Pub. No.: WO2016/005412
PCT Pub. Date: Jan. 14, 2016

(65) Prior Publication Data
US 2017/0154440 A1    Jun. 1, 2017

Related U.S. Application Data (60) Provisional application No. 62/021,278, filed on Jul. 7, 2014.

(30) Foreign Application Priority Data

Jul. 7, 2014    (GB) .................................. 1412060.4

(51) Int. Cl.
*G06K 9/00*    (2006.01)
*G06T 7/579*    (2017.01)
*G06T 17/10*    (2006.01)

(52) U.S. Cl.
CPC ............ *G06T 7/579* (2017.01); *G06K 9/0063* (2013.01); *G06T 17/10* (2013.01);
(Continued)

(58) Field of Classification Search
None
See application file for complete search history.

(56) References Cited

U.S. PATENT DOCUMENTS 5,721,691 A     2/1998  Wuller et al.
2002/0140822 A1 10/2002 Kahn et al.
(Continued)

FOREIGN PATENT DOCUMENTS

CN    1526121 A     9/2004
CN    104704424 A   6/2015
(Continued)

OTHER PUBLICATIONS

Lichun et al., "A New Navigation Approach of Terrain Contour Matching Based on 3-D Terrain Reconstruction From Onboard Image Sequence", Science China Technological Sciences, vol. 53, No. 5, Apr. 15, 2010. (Year: 2010).*

(Continued)

*Primary Examiner* — Fred H Hu
(74) *Attorney, Agent, or Firm* — Bacon & Thomas, PLLC (57) ABSTRACT

A method for performing photogrammetric 3D reconstruction of objects imaged in a sequence of images, the images containing distinct regions representing imaged radiation in respective distinct wavelengths, the method having the steps: selecting a plurality of subsets from the sequence of images, each one of the plurality of subset containing a plurality of images, each image of which represents a field of view that overlaps with a field of view of at least one other image in the same subset; generating a set of intermediate 3D models by performing photogrammetric 3D reconstruc-
(Continued)

tion on the images in respective ones of the subsets; and recombining the intermediate 3D models from the set of 3D models into a combined 3D model.

9 Claims, 5 Drawing Sheets

(52) U.S. Cl.
CPC .............. *G06T 2200/04* (2013.01); *G06T 2207/10016* (2013.01); *G06T 2207/10036* (2013.01); *G06T 2207/30181* (2013.01)

(56) References Cited

U.S. PATENT DOCUMENTS

| | | |
|---|---|---|
| 2006/0269124 A1 | 11/2006 | Harada et al. |
| 2010/0204964 A1 | 8/2010 | Pack et al. |
| 2012/0257047 A1 | 10/2012 | Biesemans et al. |
| 2014/0160253 A1 | 6/2014 | Backman et al. |

FOREIGN PATENT DOCUMENTS

| | | | |
|---|---|---|---|
| JP | H07190767 A | 7/1995 | |
| JP | 2005332177 A | 12/2005 | |
| JP | 2013514572 A | 4/2013 | |
| WO | 2008/052092 A2 | 5/2008 | |
| WO | 2011/073430 A1 | 6/2011 | |
| WO | WO-2011073430 A1 * | 6/2011 | ........... G01C 11/025 |
| WO | 2014/031284 A1 | 2/2014 | |
| WO | 2014/112911 A1 | 7/2014 | |
| WO | 2014/151746 A2 | 9/2014 | |

OTHER PUBLICATIONS

International Search Report (ISR) dated Oct. 7, 2015, for PCT/EP2015/065524.
Written Opinion dated Oct. 7, 2015, for PCT/EP2015/065524.
International Preliminary Report on Patentability (IPRP) dated Oct. 24, 2016, for PCT/EP2015/065524.
Second Written Opinion dated Jun. 27 2016, for PCT/EP2015/065524.
Lichun et al., "A New Navigation Approach of Terrain Contour Matching Based on 3-D Terrain Reconstrction From Onboard Image Sequence", Science China Technological Sciences, vol. 53, No. 5, Apr. 15, 2010.
Turner et al., "Direct Georeferencing of Ultrahigh-Resolution UAV Imagery", IIEE Transactions on Geoscience and Remote Sensing, vol. 52, No. 5, May 1, 2014.
Sima et al., "Semi-Automated Registration of Close-Range Hyperspectral Scans Using Driented Digital Camera Imagery and a 3D Model", The Photogrammetric Record, vol. 29, No. 145, Mar. 13, 2014.
Franck et al., "Sliding Adjustment for 3D Video Representation", EURASIP Journal of Applied Signal Processing, vol. 10, Jan. 1, 2002.
British Search Report dated Jan. 19, 2015, for GB 1412060.4.
Japanese Office Action in corresponding Japanese Application No. 2017-500989, dated May 28, 2019.
Guidance (office work), First Survey Practice, Sep. 27, 2003, pp. 1-29, http://www.ritsumei.ac.jp/se/rv/sasatani/2003/suvey/handout/survey 01.ppt, http://www.ritsumei.ac.jp/se/rv/sasatani/2003/suvey/handout.html (Partial translation of pp. 13-15 indicated as relevant in the JP Office Action)
Chinese Office Action in corresponding Chinese Application No. 201580037435.6, dated Aug. 5, 2019.

* cited by examiner

60% overlap

Fig. 3

Image$_i$    Image$_{i+1}$ viewing ray ground object

METHOD AND SYSTEM FOR PHOTOGRAMMETRIC PROCESSING OF IMAGES

The invention relates to the field of image capturing e.g. in aerial imaging. More particularly, the present invention relates to sensing systems for obtaining multi-spectral images, corresponding imaging systems and methods for using them.

BACKGROUND OF THE INVENTION

Hyperspectral imaging is a form of spectral imaging wherein information from across the electromagnetic spectrum is collected in many narrow spectral bands and processed. From the different spectral images that are collected, information of the objects that are imaged can be derived. For example, as certain objects leave unique spectral signatures in images which may even depend on the status of the object, information obtained by multi-spectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information. Whereas originally hyperspectral remote sensing was mainly used for mining and geology, other applications such as ecology, agriculture and surveillance also make use of the imaging technique.

It is known to use photogrammetric techniques to infer three-dimensional information, in particular elevation information, from the acquired two-dimensional images. An example of such a technique is disclosed in Alsadik, B. S., Gerke, M., & Vosselman, G. (2012), "Optimal Camera Network Design For 3D Modeling Of Cultural Heritage", *ISPRS Annals of the Photogrammetry, Remote Sensing and Spatial Information Sciences*, I-3, 7-12.

Some agricultural and ecological applications are known wherein hyperspectral remote sensing is used, e.g. for monitoring the development and health of crops, grape variety detection, monitoring individual forest canopies, detection of the chemical composition of plants as well as early detection of disease outbreaks, monitoring of impact of pollution and other environmental factors, etc. are some of the agricultural applications of interest. Hyperspectral imaging also is used for studies of inland and coastal waters for detecting biophysical properties. In mineralogy, detection of valuable minerals such as gold or diamonds can be performed using hyperspectral sensing, but also detection of oil and gas leakage from pipelines and natural wells are envisaged. Detection of soil composition on earth or even at other planets, asteroids or comets also are possible applications of hyperspectral imaging. In surveillance, hyperspectral imaging can for example be performed for detection of living creatures.

International patent application publication WO 2011/073430 A1, in the name of the present applicant, discloses a sensing device for obtaining geometric referenced multi-spectral image data of a region of interest in relative movement with respect to the sensing device. The sensing device comprises a first two dimensional sensor element and a spectral filter. The spectral filter and the first sensor element are arranged for obtaining spectral information at a first wavelength or wavelength range using a part of the first sensor element and for obtaining spectral information at a second wavelength or wavelength range using another part of the first sensor element. As a result of this arrangement, different parts of a single image acquired with the first sensor will represent the imaged scenery as seen is radiation of a different respective wavelength.

To date, there is no satisfactory way to apply the aforementioned photogrammetric techniques to multispectral images such as those acquired by means of the first sensor of WO 2011/073430 A1.

SUMMARY OF THE INVENTION

According to an aspect of the present invention, there is provided a method for performing photogrammetric 3D reconstruction of objects imaged in a sequence of images, the images containing distinct regions representing imaged radiation in respective distinct wavelengths, the method comprising: selecting a plurality of subsets from the sequence of images, each one of the plurality of subset containing a plurality of images, each image of which represents a field of view that overlaps with a field of view of at least one other image in the same subset; generating a set of intermediate 3D models by performing photogrammetric 3D reconstruction on the images in respective ones of the subsets; and recombining the intermediate 3D models from the set of 3D models into a combined 3D model.

It is an advantage of the present invention that photogrammetric 3D reconstruction is not performed on the basis of immediately consecutive images, for which the parallax would be too small to provide adequate accuracy, but on the basis of subsets of images that are sufficiently spaced apart, while still partially overlapping. It is a further advantage of the present invention that the full spectral information is kept, by virtue of the recombination of the intermediate models in the final step.

In an embodiment of the method according to the present invention, the subsets are mutually disjoint, and the union of the subsets coincides with the sequence of images.

This embodiment provides the most computationally efficient use of the sequence of images, while using all available acquired information.

In an embodiment of the method according to the present invention, the sequence of images is acquired by means of a hyperspectral sensor comprising a sensor element and a spectral filter, the spectral filter and the first sensor element being arranged for obtaining spectral information at a first wavelength or wavelength range using a part of the sensor element and for obtaining spectral information at a second wavelength or wavelength range using another part of the sensor element.

This is a particularly efficient way to obtain hyperspectral images, which may be used in the present invention.

In an embodiment of the method according to the present invention, the sequence of images is acquired by means of a sensor carried on board of an aerial vehicle.

Aerial photography provides an advantageous way to obtain images of large areas of the earth's surface.

According to an aspect of the present invention, there is provided a computer program product comprising code means configured to cause a processor to carry out the method as described above.

According to an aspect of the present invention, there is provided a system for performing photogrammetric 3D reconstruction of objects imaged in a sequence of images, the images containing distinct regions representing imaged radiation in respective distinct wavelengths, the system comprising a processor configured to: select a plurality of subsets from the sequence of images, each one of the plurality of subset containing a plurality of images, each image of which represents a field of view that overlaps with a field of view of at least one other image in the same subset; generate a set of intermediate 3D models by performing photogrammetric 3D reconstruction on the images in respective ones of the subsets; and recombine the intermediate 3D models from the set of 3D models into a combined 3D model.

In an embodiment, the system according to the present invention further comprises a sensor for acquiring the sequence of images.

The technical effects and advantages of embodiments of the computer program and system according to the present invention correspond, mutatis mutandis, to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DETAILED DESCRIPTION OF THE INVENTION

"3D reconstruction", as used in the present description, is the process of capturing the shape (and appearance) of real objects.

"Photogrammetric 3D reconstruction", as used in the present description, also called "structure from motion" or "image-based modelling", is the process of capturing the shape (and appearance) of real objects using imagery. Photogrammetric 3D reconstruction of an object requires a minimum of 2 images of that object, acquired from different viewpoints; in many practical circumstances, when the camera calibration is not sufficiently precise, 3 images will be required. The coordinates of pixels in the image sequence corresponding to one ground location (object point) are used to derive simultaneously (bundle adjustment): interior image orientation parameters, exterior image orientation parameters, and 3D coordinates of the ground point (object point). The accuracy of the 3D reconstruction results depends (among others) on the image network (e.g. forward and side overlap).

Figure 1:
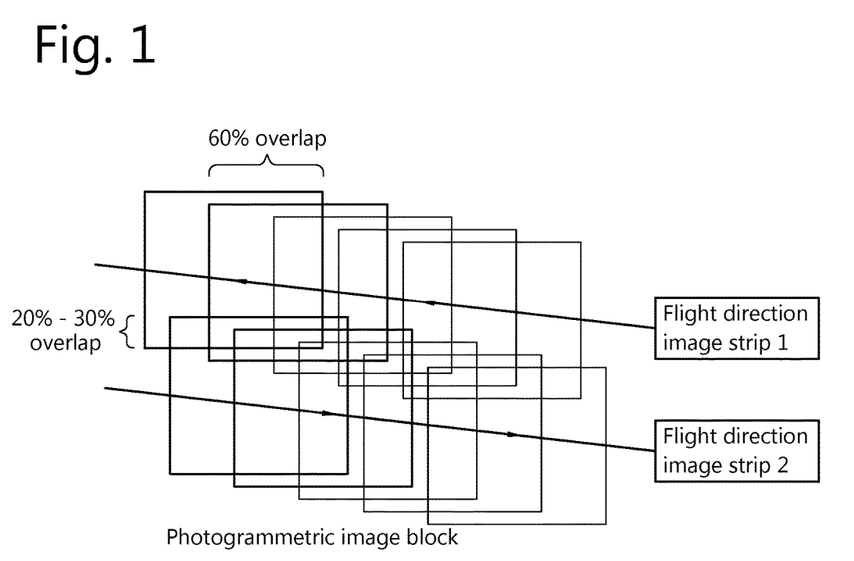
FIG. 1 schematically illustrates the flying path taken by an exemplary aerial vehicle used to acquire images of the earth, and the boundaries of consecutive images acquired by a sensor aboard such vehicle.

FIG. 1 schematically illustrates the flying path taken by an exemplary aerial vehicle used to acquire images of the earth, and the boundaries of consecutive images acquired by a sensor aboard such vehicle, shown as a two-dimensional map (plan view). The sequence of images thus acquired will hereinafter also be referred to as an "image network". The sensor may be active in the visual range (e.g., an RGB senor), or in another specific spectral region (e.g. near infrared, short-wave infrared, etc.).

As the acquired images are two-dimensional, multiple images are needed to allow three-dimensional reconstruction of the imaged terrain. In particular, three-dimensional reconstruction of individual features requires these features to be present in several images taken from different angles, which implies that subsequent images acquired by the sensor must display sufficient overlap. As illustrated in FIG. 1, a typical value of the amount of overlap between consecutive images taken in a given flying direction is in the order of 60%. The sideways overlap between images acquired during a first pass and a second pass of adjacent respective strips of terrain, whereby the first pass and the second pass typically correspond to different flying directions, is in the order of 20-30%.

Figure 2:
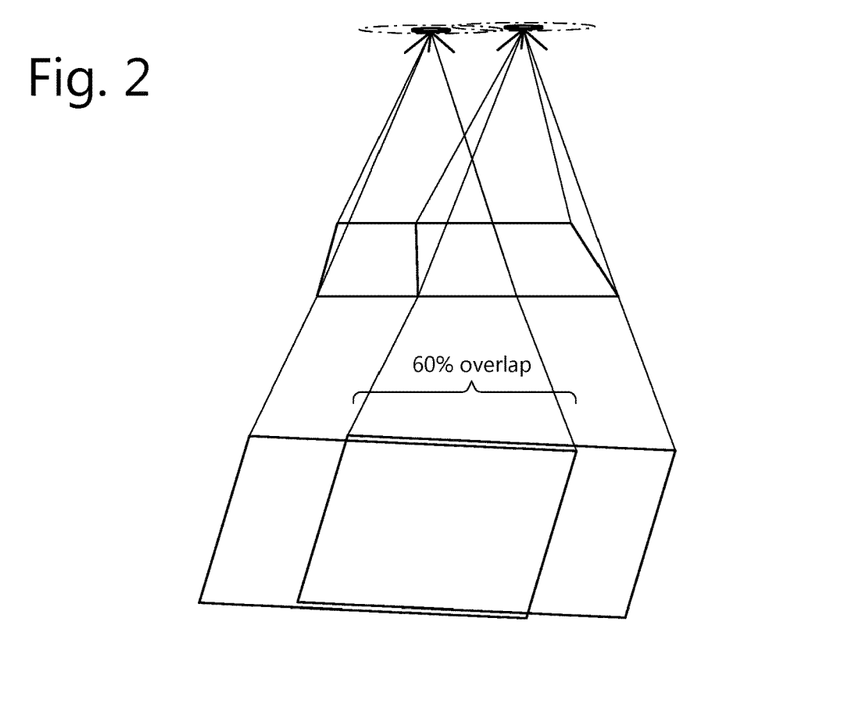
FIG. 2 provides a perspective view of the region imaged by two consecutive acquisitions in the map of FIG. 1.

FIG. 2 provides a perspective view of the region imaged by two consecutive acquisitions in the map of FIG. 1, indicating in particular the area of overlap between the imaged areas.

Figure 3:
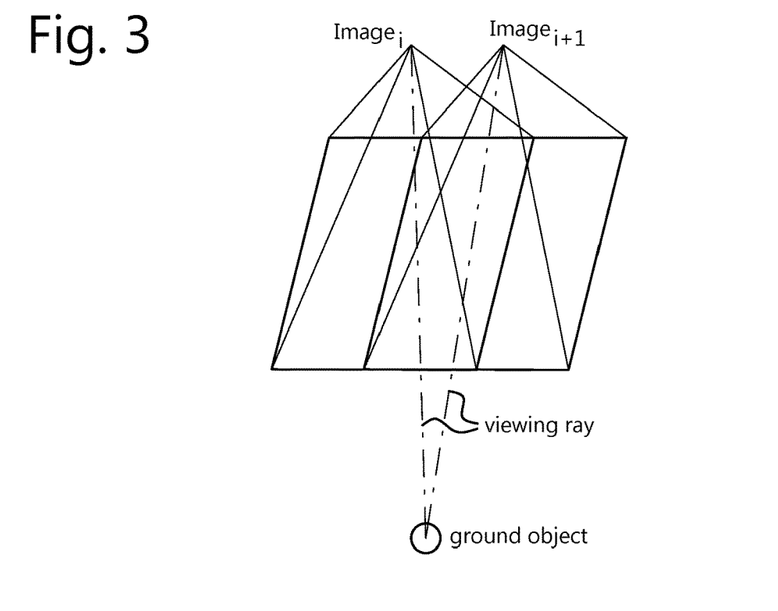
FIG. 3 schematically represents the angle of view of the sensor of FIGS. 1 and 2 for consecutive imaging positions.

FIG. 3 schematically represents the angle of view of the sensor of FIGS. 1 and 2 for consecutive imaging positions, and illustrates how the viewing ray from the sensor to any given ground object changes significantly from one image (image$_i$) to the next (image$_{i+1}$). This difference in viewing angle is what allows the photogrammetric reconstruction of 3D characteristics of the feature, in particular its elevation.

Figure 4:
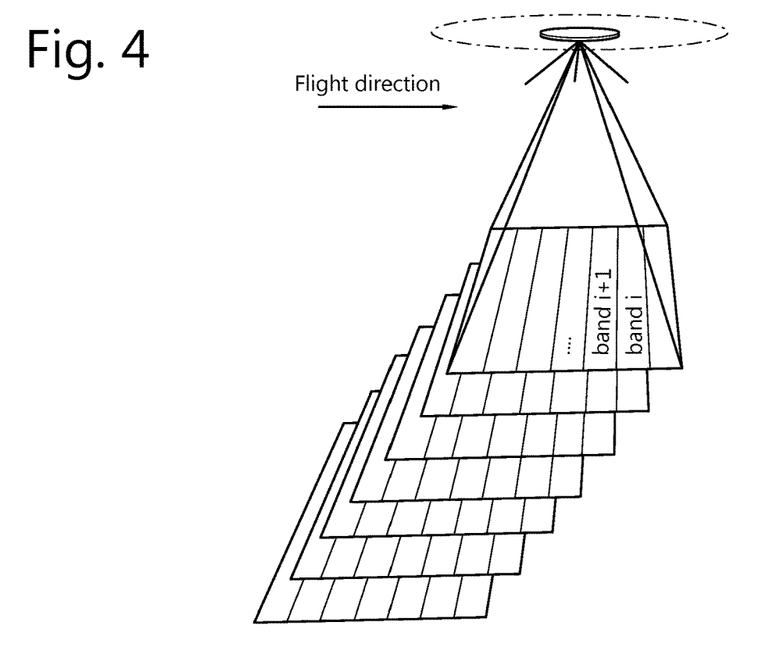
FIG. 4 provides a perspective view of the region imaged by consecutive acquisitions of a multi-spectral sensor, in particular a hyperspectral sensor.

FIG. 4 provides a perspective view of the region imaged by consecutive acquisitions of a multi-spectral sensor, in particular a hyperspectral sensor. An example of a hyperspectral sensor is disclosed in international patent application publication WO 2011/073430 A1, in the name of the present applicant, where it is described as the "first sensor", operating in conjunction with a second (visual-range) sensor. While the "first sensor" of WO 2011/073430 A1 shall be referred to in order to clarify the present invention, it must be understood that the present invention is not limited thereto.

It is typical of such hyperspectral sensors that different parts of the sensing element are sensitive to different wavelengths. This effect may be obtained by providing a sensing element with a filtering layer that has a wavelength response that varies across the surface of the sensing element. Accordingly, each image taken by such a hyperspectral sensor is in fact a mosaic in which different parts of the image represent the corresponding part of the terrain as seen in radiation of different respective wavelength bands. In order to obtain an image of any given area as seen in radiation of one specific wavelength band, the relevant parts of a large number of such mosaics must be pieced together. It is clear that these hyperspectral sensors require closely spaced images (which, depending on the speed of the sensor movement, may require a very high frame rate) to ensure full spatial coverage in all the relevant bands of the spectrum.

Figure 5:
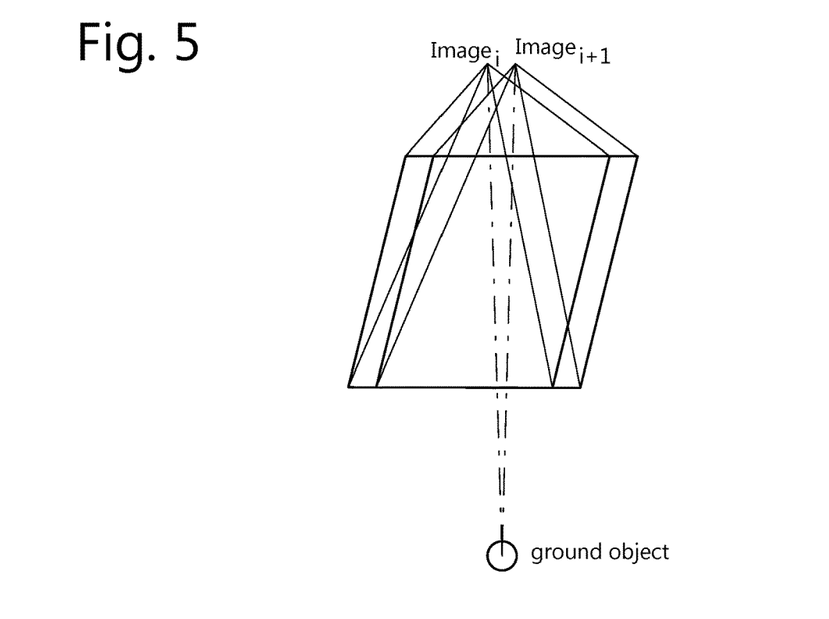
FIG. 5 schematically represents the angle of view of the sensor of FIG. 4 for consecutive imaging positions.

FIG. 5 schematically represents the angle of view of the sensor of FIG. 4 for consecutive imaging positions, and illustrates how the viewing ray from the sensor to any given ground object changes significantly from one image (image$_i$) to the next (image$_{i+1}$). As a result of the high frame rate of these hyperspectral sensors, the difference in viewing angle, which is needed for photogrammetric reconstruction of 3D characteristics of ground features, becomes very small. This negatively impacts the accuracy (in terms of vertical position estimation, exterior image orientation, interior image orientation, etc.) that can be achieved with such images. Moreover, methods for dealing with small parallax image sets tend to be so demanding from a computational point of view, that it is not feasible in practice for large data sets.

The present invention is based inter alia on the inventive insight of the inventors that the aforementioned loss of accuracy can be overcome by adequately selecting the images on which the 3D reconstruction is to be performed. The present invention is further based on the insight of the inventors that, unlike for monochromatic or RGB image series, it is not possible to simply discard intermediate images which do not contribute to an accurate 3D construction.

Figure 6:
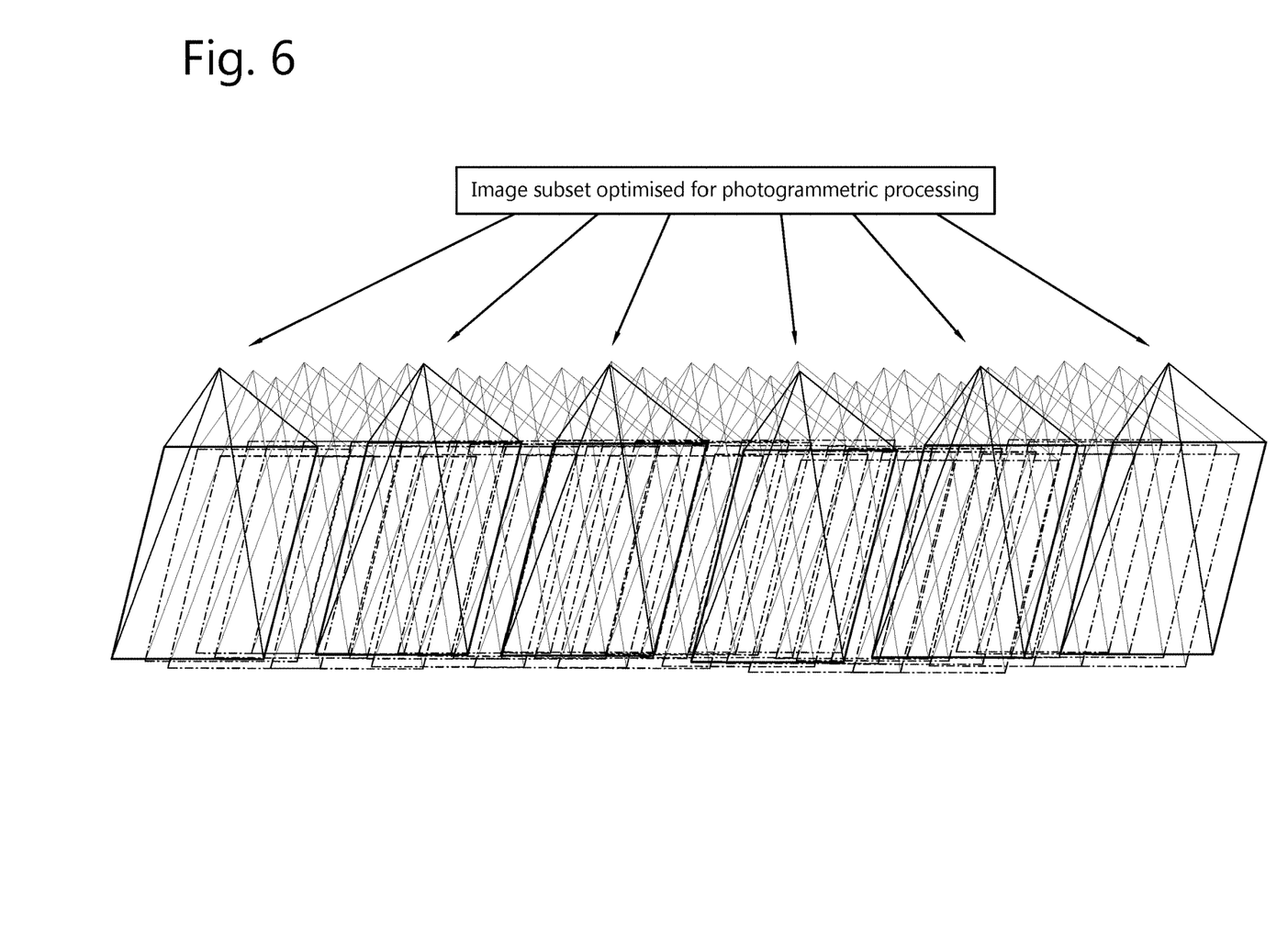
FIG. 6 schematically illustrates the principle of the present invention.
Figure 7:
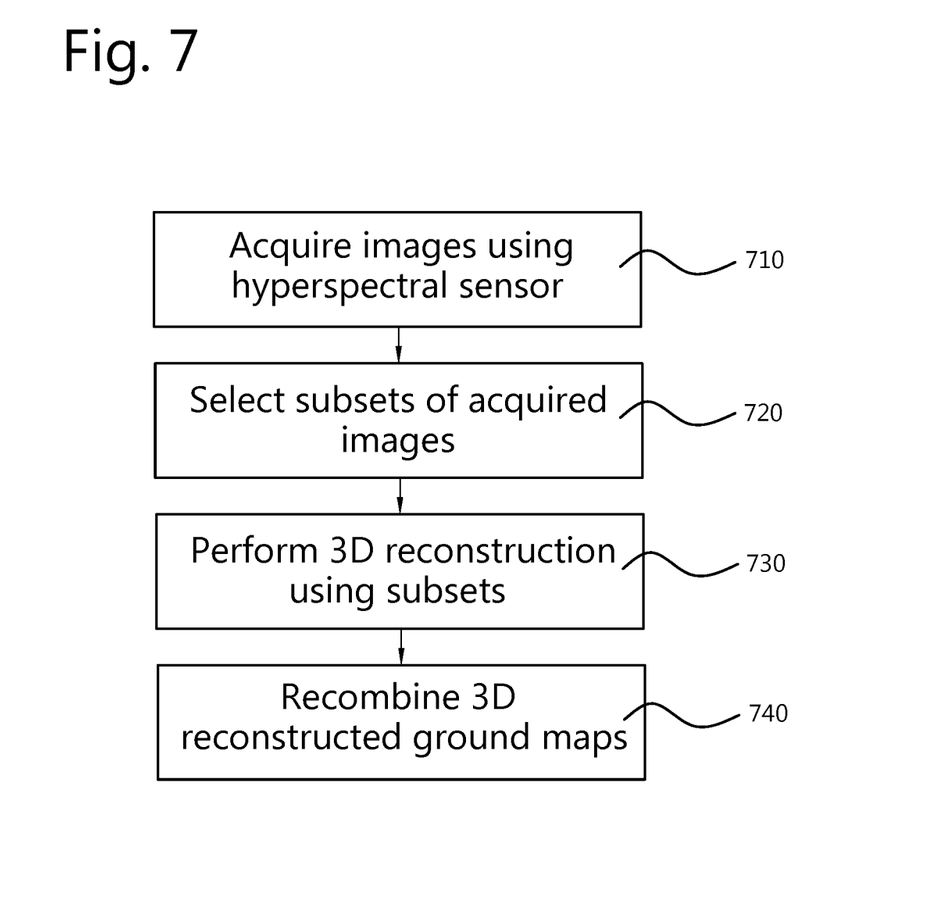
FIG. 7 provides a flow chart representing an embodiment of the method according to the present invention.

FIG. 6 schematically illustrates the principle of the present invention, which is further represented by means of a flow chart in FIG. 7.

FIG. 6 schematically illustrates the selection of a subset of images from an image network acquired with a hyperspectral sensor (cfr. FIG. 4). The elements in each subset have sufficient mutual overlap to allow photogrammetric 3D reconstruction, while being sufficiently spaced apart to obtain sufficiently large angular differences of the viewing rays relating to specific objects, such that high-accuracy 3D reconstruction becomes possible.

It can easily be seen that a number of different subsets can be selected that meet these criteria. However, any given non-trivial subset will not have complete hyperspectral information for the entire imaged area, and, conversely, a given subset will not provide full spatial coverage for any given wavelength band.

Therefore, the image network is preferably partitioned in a set of subsets, each of which meets the aforementioned criteria for overlap and 3D reconstruction accuracy, and the union of which coincides with the original image network.

According to the present invention, the respective 3D reconstructions obtained from the different subsets are then recombined into one image set. This recombination step can be carried out by the skilled person using commercially available software, such as the "Photoscan" product from Agisoft LLC.

FIG. 7 provides a flow chart representing an exemplary embodiment of the method according to the present invention. The method performs photogrammetric 3D reconstruction of objects imaged in a sequence of images, which contain distinct regions representing imaged radiation in respective distinct wavelengths. These images are first acquired 710, typically with a hyperspectral sensor as described above. The sensor may be carried on board of an aerial vehicle. The method comprises selecting 720 a plurality of subsets from the sequence of images, each one of the plurality of subset containing a plurality of images, each image of which represents a field of view that overlaps with a field of view of at least one other image in the same subset. Next, a set of intermediate 3D models is generated 730 by performing photogrammetric 3D reconstruction on the images in respective ones of the subsets. These intermediate 3D models are then recombined 740 from the set of 3D models into a combined 3D model.

For multi-spectral or hyperspectral images, 3D reconstruction can proceed in the same way as for single wavelength band images, e.g. by detecting the position shift and the related viewing angle difference of the same feature as it appears in different images.

Due to the nature of multi-spectral and hyperspectral images, a common feature that is present in multiple images will actually appear differently in different images, because it is captured by different parts of the sensing element, and thus seen in radiation of a different wavelength. Assuming a monotonic variation of the wavelength sensitivity peak across the surface of the sensing element, the difference between the wavelengths in which a given feature is seen on two different images might increase the further apart the images were acquired. As the present invention performs 3D reconstruction with images that are several steps apart from each other (in terms of the spatial and temporal sequence in which the images were acquired), the spectral appearance of these images may be expected to be potentially quite different from one image to the next.

Surprisingly, the inventors of the present invention have found that image matching routines that are used in the 3D reconstruction process work adequately for images acquired with practical hyperspectral sensors, despite the difference in spectral content for any given feature between the different images in the subset.

However, the inventors have found that the performance of the image matching routines can be further improved by providing an optional preliminary renormalization step. This preliminary renormalization step to be applied in embodiments of the present invention; with reference to FIG. 7, it could for example take place between step 710 and step 720. It may comprise dividing the images in the set in identically arranged areas; for each of the areas, calculating a predetermined characteristic across said set of images; and, for each of the images, renormalizing intensity values in each of the areas in function of the predetermined characteristic of said area. For the said areas, one or more representative characteristics of the intensity values can be calculated. The average intensity value over the area is one such characteristic. Another useful characteristic is the standard deviation of the intensity values, which gives an indication of the contrast which will be measured. More generally, the distribution of the intensity values could be calculated and represented in a larger set of characteristics. The set of obtained characteristics per area can be used as normalization coefficients. After applying normalization using the characteristics, the values of those characteristics become uniform over different areas in in the resulting images.

The procedure to determine the normalization coefficients is carried out by averaging over a sufficiently large set of images, in order to average out the effect of the image content. Afterwards, the normalization can be carried out using the established coefficients, either on the same images, or on other images acquired in a similar way with the same instrument. This procedure simplifies the way of working as it is not necessary to calculate new coefficients for every new set of images.

The pre-processing based embodiments are inter alia based on the insight of the inventors that there are two components to the difference in intensity of a given physical feature between different spectral images of the same acquisition series, which represent the physical feature in different wavelength bands: (1) the physical feature may have a different reflectivity in different wavelength bands and (2) the sensor may have a different sensitivity in different wavelength bands. The second factor can be compensated by renormalizing the various parts of the images relative to an average value that is representative for each respective part. While it is not possible to compensate for the first factor, the inventors have surprisingly found that the efficiency of registration algorithms already greatly improves after compensating the second factor alone. The effect is believed to be due to the fact that real-world physical objects typically exhibit a slowly varying reflectivity in function of wavelength over a large part of the spectrum of interest.

The predetermined characteristic may be an average intensity, and the renormalizing may comprise renormalizing the intensity values in each of the areas relative to the average intensity value.

The areas may correspond to individual pixels. It is an advantage of this embodiment that the sensor is effectively calibrated on a per-pixel basis, such that variations in sensitivity of individual pixel-filter combinations can be accounted for, regardless of the source of such variations (including manufacturing tolerances or impurities in the filter). This leads to a maximal suppression of artefacts. By adding an optical system to the pixel-filter combinations, a complete imaging system is obtained. It can be chosen to include sensitivity variations caused by the optical system to correct for those, or to exclude them so that the system remains generic for different optical systems.

Alternatively, the areas may correspond to distinct wavelength bands. It is an advantage of this embodiment that the renormalization can be performed per block of pixels, wherein a block typically represents a rectangular strip of the sensor or a combination of multiple rectangular areas.

In one aspect, the present invention also relates to a processing system wherein the method as described in embodiments of the previous aspects are implemented in a software based manner. Such a processing system may include at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem. The memory of the memory subsystem may at some time hold part or all of a set of instructions that when executed on the processing system implement the steps of the method embodiments described herein.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A method for performing photogrammetric 3D reconstruction of a terrain imaged in a sequence of images, said images containing distinct parts representing corresponding parts of said imaged terrain in respective distinct wavelength bands, the method comprising:
   obtaining said sequence of images containing said distinct parts in respective distinct wavelength bands using a sensing element with a filtering layer that has a wavelength response that varies across a surface of the sensing element;
   dividing said sequence of images in identically arranged areas, wherein for each of the identically arranged areas, calculating a predetermined characteristic across said sequence of images, and for each image of the sequence of images, renormalizing intensity values in each of the identically arranged areas in function of the predetermined characteristic;
   selecting a plurality of subsets from said sequence of images, each one of said plurality of subset containing a plurality of images, each image of which represents a field of view that overlaps with a field of view of at least one other image in the same subset;
   generating a set of intermediate 3D models by performing photogrammetric 3D reconstruction on the images in respective ones of said subsets; and
   recombining said intermediate 3D models from said set of 3D models into a combined 3D model.

2. The method according to claim 1, wherein said subsets are mutually disjoint, and wherein the union of said subsets coincides with said sequence of images.

3. The method according to claim 1, wherein said sequence of images is acquired by means of a hyperspectral sensor comprising a sensor element and a spectral filter, the spectral filter and the first sensor element being arranged for obtaining spectral information at a first wavelength or wavelength range using a part of the sensor element and for obtaining spectral information at a second wavelength or wavelength range using another part of the sensor element.

4. The method according to claim 1, wherein said sequence of images is acquired by means of a sensor carried on board of an aerial vehicle.

5. A computer program product comprising code means configured to cause a processor to carry out the method according claim 1.

6. A system for performing photogrammetric 3D reconstruction of a terrain imaged in a sequence of images, said images containing distinct parts representing corresponding parts of said imaged terrain in respective distinct wavelength bands, the system comprising a processor configured to:

obtain said sequence of images containing said distinct parts in respective distinct wavelength bands using a sensing element with a filtering layer that has a wavelength response that varies across a surface of the sensing element;

divide said sequence of images in identically arranged areas, wherein for each of the identically arranged areas, calculate a predetermined characteristic across said sequence of images, and for each image of the sequence of images, renormalize intensity values in each of the identically arranged areas in function of the predetermined characteristic;

select a plurality of subsets from said sequence of images, each one of said plurality of subset containing a plurality of images, each image of which represents a field of view that overlaps with a field of view of at least one other image in the same subset;

generate a set of intermediate 3D models by performing photogrammetric 3D reconstruction on the images in respective ones of said subsets; and recombine said intermediate 3D models from said set of 3D models into a combined 3D model.

7. The system according to claim 6, further comprising a sensor for acquiring said sequence of images.

8. A processor for performing photogrammetric 3D reconstruction of a terrain imaged in a sequence of images, said images containing distinct parts representing corresponding parts of said imaged terrain in respective distinct wavelength bands, comprising:

an imager configured to obtain said sequence of images containing said distinct parts in respective distinct wavelength bands using a sensing element with a filtering layer that has a wavelength response that varies across a surface of the sensing element;

a divider configured to divide said sequence of images in identically arranged areas, wherein for each of the identically arranged areas, calculate a predetermined characteristic across said sequence of images, and for each image of the sequence of images, a renormalizer configured to renormalize intensity values in each of the identically arranged areas in function of the predetermined characteristic;

a selector configured to select a plurality of subsets from said sequence of images, each one of said plurality of subset containing a plurality of images, each image of which represents a field of view that overlaps with a field of view of at least one other image in the same subset;

a generator configured to generate a set of intermediate 3D models by performing photogrammetric 3D reconstruction on the images in respective ones of said subsets; and a recombiner configured to recombine said intermediate 3D models from said set of 3D models into a combined 3D model.

9. The processor according to claim 8, further comprising a sensor for acquiring said sequence of images.

* * * * *